United States Patent [19]

Lively et al.

[11] Patent Number: 5,780,973
[45] Date of Patent: Jul. 14, 1998

[54] VEHICLE WINDSHIELD WIPER-LIGHT CONTROL SYSTEM INCORPORATING DAYTIME RUNNING LIGHT MODE

[76] Inventors: Joseph M. Lively, 110 Willard Ave., Farmingdale, N.Y. 11735; Ronald Koppel, 44 Glades Way, Huntington, N.Y. 11743; Edwin Kirchmeier, 35 Falcon Dr., Hauppauge, N.Y. 11788

[21] Appl. No.: 671,605

[22] Filed: Jun. 28, 1996

[51] Int. Cl.$^6$ ...................................... B60Q 1/26
[52] U.S. Cl. .............................. 315/80; 315/82; 315/83; 307/10.1; 307/10.8
[58] Field of Search ............... 315/77, 80, 82, 315/83, 155, 156; 307/10.1, 10.8; 340/468, 469, 472

[56] References Cited

U.S. PATENT DOCUMENTS

| | | | |
|---|---|---|---|
| 3,591,845 | 7/1971 | Vanderpool et al. | 307/10 |
| 3,600,596 | 8/1971 | Aloisantoni | 307/10 |
| 3,628,085 | 12/1971 | Brock | 315/82 |
| 4,057,742 | 11/1977 | Binegar | 307/10 LS |
| 4,097,839 | 6/1978 | Lesik | 340/52 R |
| 4,139,801 | 2/1979 | Linares | 315/83 |
| 4,236,099 | 11/1980 | Rosenblum | 315/83 |
| 4,656,363 | 4/1987 | Carter et al. | 307/10 LS |
| 4,665,321 | 5/1987 | Chang et al. | 307/10 LS |
| 4,956,562 | 9/1990 | Benedict et al. | 307/10.8 |
| 5,027,001 | 6/1991 | Torbert | 307/10.1 |
| 5,051,873 | 9/1991 | Ruter | 362/61 |
| 5,136,209 | 8/1992 | Benedict et al. | 315/80 |
| 5,168,196 | 12/1992 | Briggette, Sr. et al. | 315/82 |
| 5,170,097 | 12/1992 | Montemurro | 315/83 |
| 5,185,558 | 2/1993 | Benedict et al. | 315/80 |
| 5,187,383 | 2/1993 | Taccetta et al. | 307/10.8 |
| 5,444,307 | 8/1995 | Sheets et al. | 307/10.8 |
| 5,449,974 | 9/1995 | Dubar | 315/82 |
| 5,457,347 | 10/1995 | Ruter | 307/10.1 |
| 5,519,257 | 5/1996 | Lock, III et al. | 307/10.8 |
| 5,589,716 | 12/1996 | Dailey | 307/10.8 |
| 5,592,146 | 1/1997 | Kover, Jr. | 340/468 |

*Primary Examiner*—Robert Pascal
*Assistant Examiner*—Haissa Philogene
*Attorney, Agent, or Firm*—Schweitzer Cornman Gross & Bondell LLP

[57] ABSTRACT

A windshield wiper-light control system provides running light functionality to vehicle headlights in association with the coupled operation of the vehicle's windshield wiper system and lights. A pulse generator provides a pulsed output to drive the headlight at a reduced effective power level. Further logic also disables the pulse generator when the vehicle's ignition is off. A light sensor system may be incorporated to allow automatic operation of the vehicle's lights in response to darkness. When the windshield wipers are engaged, the pulse generator is placed into a continuously on output mode, providing full power to the lights. Simultaneously power may be applied to other vehicle lights, such as the taillight and dashboard lights.

11 Claims, 1 Drawing Sheet

& nbsp;
VEHICLE WINDSHIELD WIPER-LIGHT CONTROL SYSTEM INCORPORATING DAYTIME RUNNING LIGHT MODE The present application relates to an automotive accessory and in particular to a new and improved apparatus for controlling vehicle lights for operation in conjunction with activation of the vehicle's windshield wipers and which further incorporates means for providing daytime running light function for the vehicle's headlights.

BACKGROUND OF THE INVENTION

Many states have enacted statutes or regulations which require the activation of a vehicle's lights whenever the windshield wipers are used. This normally requires the driver to manually engage the light switch after separately turning on the wipers, followed by turning off the lights when the wipers are disengaged. Numerous systems have been developed to automate the process, and to insure coordination between both turn-on and turn-off. These systems typically provide an auxiliary electrical link between the windshield wiper system's wiper motor switch and the headlight circuit. Representative of such systems are the disclosures of U.S. Pat. Nos. 5,449,974; 5,170,097; 5,136,209; and 5,051,873.

As a further safety development, efforts are afoot to require the operation of daytime running lights on vehicles. Such running lights are intended to be engaged, and typically provide a low-intensity headlight-like beam, whenever the vehicle ignition is engaged. The running light function is overridden when the vehicle's headlights are turned on in the normal manner. Most cars on the road are not provided with a running light feature and thus are denied the demonstrated safety benefit of such a system.

It is accordingly a purpose of the present invention to provide vehicle accessory which allows the incorporation of a running light function into a vehicle not otherwise having such a capability.

It is a further purpose of the present invention to provide a vehicle accessory in the form of an integrated unit which provides both the aforementioned running light capability in connection with the automated concurrent energization of the vehicle's lights with operation of the windshield wiper system.

It is still a further purpose of the present invention to provide such an integrated running light/wiper-headlight system in an apparatus which is economical to manufacture and install and which may be utilized in connection with a wide variety of vehicles.

BRIEF DESCRIPTION OF THE INVENTION

In accordance with the aforementioned and other purposes and objects, an apparatus in accordance with the present invention comprises a circuit which provides auxiliary control over the vehicle's lights as a result of inputs received from the vehicle's existing primary ignition switch and the windshield wiper switch circuits. With an ignition switch signal present, the circuit provides partial power to the vehicle's headlights, whereby they function as running lights. With the windshield wiper switch engaged, full power is applied to the headlights. Power may simultaneously be applied to the vehicle's taillights and dashboard lights. The full power level is maintained for as long as the windshield wiper switch is engaged. When it is disengaged, the taillights and dashboard lights are extinguished, and the headlights revert to the running light mode.

The circuit may preferably include a circuit element which, upon ignition switch activation, provides a pulsed output voltage which modulates an electrical switch, allows reduced power to be applied to the vehicle headlights. Operation of the vehicle's windshield wiper switch disables the pulse circuit, allowing full power to be applied to the headlights. The wiper switch also energizes electrical switches which provide power to the taillights and dashboard lights. When the windshield wipers are shut off, the disabled condition of the pulse generator is terminated, and the running light function to be re-established, and the electrical switches to the taillights and dashboard lights are opened. Manual operation of the headlight switch provides a parallel path to the headlights, taillights and dashboard lights, such that they can be manually independently energized as desired.

In an alternative embodiment of the invention, a light sensor circuit provides an additional input to the switches for the lights. This allows for automated energizing of the headlights, taillights and dashboard lights in periods of darkness. A plurality of sensors may be provided to allow for increased reliability in the event a single sensor is placed in shadow by transient phenomena.

BRIEF DESCRIPTION OF THE DRAWINGS

A fuller understanding of the present invention will be accomplished upon consideration of the following detailed description of preferred, but nonetheless illustrative embodiments of the invention, when reviewed in conjunction with the annexed drawing, designated as FIG. 1, which is a schematic diagram of the present invention.

DETAILED DESCRIPTION OF THE INVENTION

Figure 1:
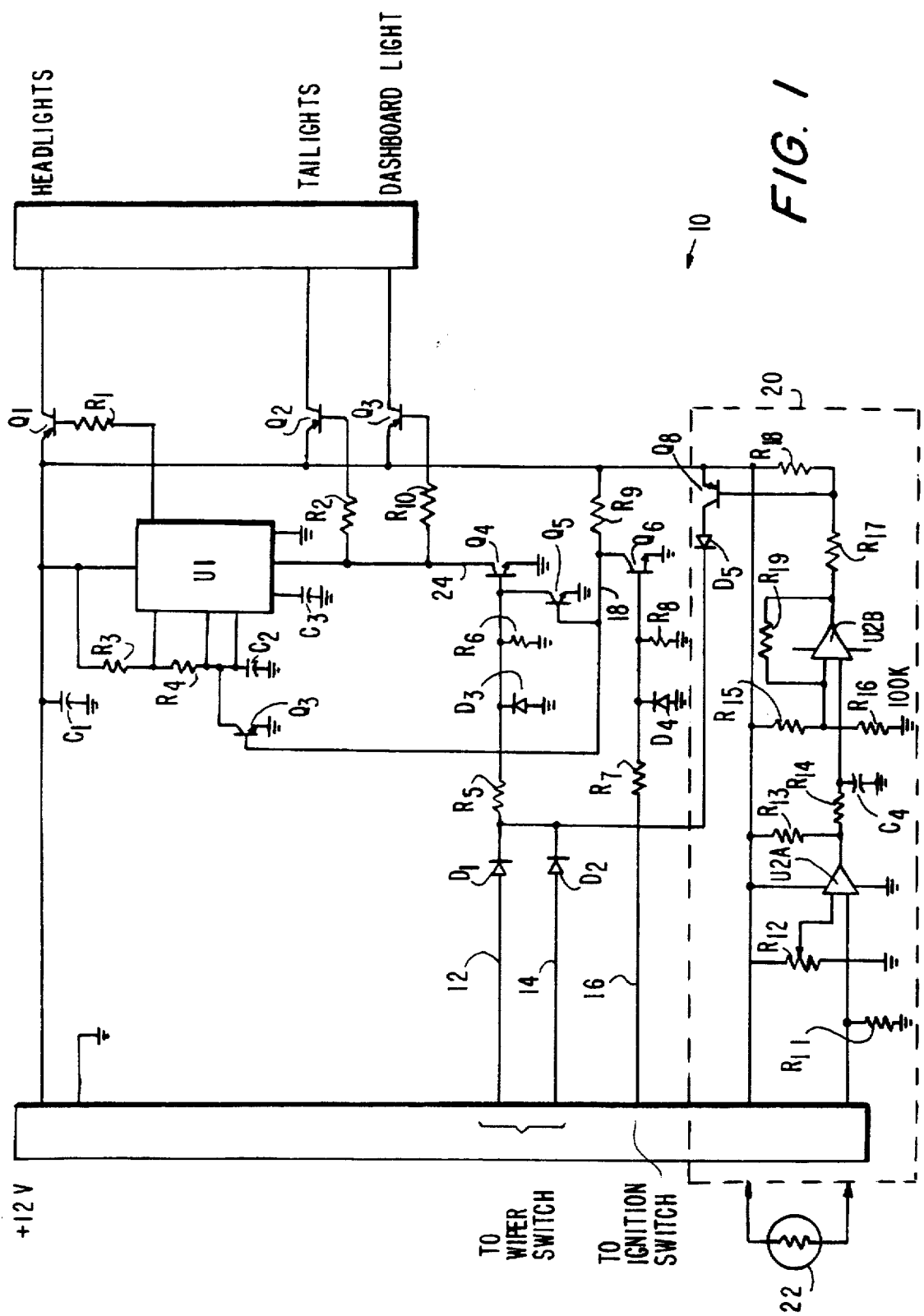

With reference to the figure, an apparatus 10 in accordance with the present invention includes switching element U1, which may preferably be a type LM555 timer integrated circuit configured as known in the art as a free-running pulse generator, with operating power being provided at terminal 8 from the vehicle's battery or power supply circuit and a ground connection at terminal 1. Control over operation of U1 is provided by reset terminal 4. U1 is enabled whenever the terminal is removed from ground. U1 is disabled and its output at pin 3 placed low whenever terminal 4 is grounded. During operation a pulsed output appears at terminal 3, continually switching between high and low states, thus turning on and off load control transistor Q1, which is in series between the vehicle's battery and headlights. The operating frequency of U1, as well as the relationship between and duration of the on and off times, is controlled by the ratio of resistors R3 and R4 and the value of capacitor C2. Such values may typically be chosen to have a duty cycle for transistor Q1 of about 33%, thus applying an effective power of one-third normal to the headlights. This maintains the headlight at a low "running light" level whenever the switching element U1 is active.

Lines 12 and 14, having isolating diodes D1 and D2 to prevent reverse current flow, connect to the load side of the vehicle's windshield wiper control switches. One or both of these terminals is placed high when the wipers are engaged. This voltage is passed to the base of light control switching transistor Q4, turning the transistor on, and dropping its collector line 24 to ground potential. The collector line is connected both to the reset terminal 4 of switching element U1, as well as to the bases of load control transistors Q2 and Q7, the emitter-collector loops of which are connected in series between the vehicle's battery and the taillights and dashboard lights, respectively. The logic circuit comprising the diodes D1 and D2 in combination with switching transistors Q4 thus couples operation of the vehicle's wiper switch with operation of the vehicle's lights. Energization of switching transistor Q4 turns both Q2 and Q7 on, thus providing power to the taillights and dashboard lights. At the same time, reset terminal 4 of U1 is grounded through Q4. This disables U1 and places its output terminal 3 low, maintaining transistor Q1 in an "on" state and providing a continuous, as opposed to a pulsed, source of voltage to the headlights. The headlights, taillights and dashboard lights remain fully on for so long as the windshield wiper switch, and thus the windshield wipers, are engaged.

Input line 16 is connected to the high side of the vehicle's main power/ignition switch, providing an input signal whenever the ignition switch is on. This voltage is applied to the base of switching transistor Q6, thus turning this transistor on whenever the ignition switch is engaged. With the transistor turned on its collector line 18 and the left end of resistor R9 are dropped from +12 volts to ground, thus providing a logical inversion of the status of the ignition switch. As line 18 is connected to the bases of transistors Q3 and Q5, the turn on of Q6 turns off both the transistors.

Both Q3 and Q5 are normally on, as their respective bases are coupled to +12 volts through resistor R9. Transistor Q3 is in parallel with the timing capacitor C2 for integrated circuit U1. When the transistor is off, C2 is electrically between terminals ⅔ and ground. When Q3 is on, however, C2 is shorted, which inhibits oscillation of U1 and drives output terminal 3 high which keeps load control transistor Q1 off. Q3 is on, and C2 shorted, when the ignition switch is off. Thus, the headlights are prevented from being engaged through Q1 whenever the ignition switch is off. Similarly, transistor Q5, which is placed across the input of light control switching transistor Q4, is "on" with the ignition switch off, thus shorting the input to Q4, keeping its collector line 24 high and insuring that taillight and dashboard light load control transistors Q2 and Q7 remain off with the ignition switch off. This prevents the taillights and dashboard lights from being energized by operation of the wiper switch without the ignition switch on.

In an alternative embodiment of the invention, the auxiliary circuit as depicted in the lower portion 20 of the figure may be incorporated to provide an additional, dark-sensing functionality. As depicted therein, light-sensitive element 22, such as a photocell or photo-transistor junction, is coupled to the series arrangement of operational amplifiers U2A and U2B, the output of which at terminal 7 controls switching transistor Q8. The light-sensitive element 22 is placed in a series voltage divider arrangement with resistor R11 between +12 volts and ground. As resistance of the light-sensitive element increases, the voltage applied to negative input terminal 2 of U2A decreases. With the resistance of the light-sensitive element high, as when it is darkness, the voltage at input terminal 2 is lower than the reference voltage applied to positive input terminal 3 through voltage divider variable resistor R12. The output of U2A is thus high. This output is applied to negative input terminal 6 of U2B, and compared to the voltage at input terminal 5 applied through the voltage divider network of resistors R15 and R16, nominally 8.25 volts. With the input at terminal 6 exceeding that of terminal 5, output terminal 7 is low. Due to the voltage divider action of R17 and R18, the base of Q8 is at a lower potential than its emitter, turning the transistor on.

The collector of Q8 is coupled through isolation diode D5 and resistor R5 to the base of light control switching transistor Q4. With Q8 on, current flows through its collector line and provides an alternative base current for light control switching transistor Q4, turning it on and energizing taillight and dashboard transistors Q2 and Q7 and placing transistor Q1 in the full on configuration through switching element U1. With the light-sensitive element illuminated, its resistance drops, placing a high voltage at U2A input terminal, shutting off U2A and turning U2B on. This raises the potential of the base of transistor Q8, turning it off and thus providing no switching bias for Q4.

It thus may be appreciated that, with the vehicle's ignition on, when either the wipers are energized or the light-sensitive element 22 is dark, the headlights, taillights and dashboard lights will be placed on, independently of the position of the vehicle's light switch. It is contemplated that a plurality of light-sensitive elements may be used in connection with the present invention such that the combined overall parallel resistance of the elements must be sufficiently high to allow circuit operation. With judicious location of such elements about the vehicle, the likelihood of false light system triggering due to the transient darkness of a single one of the light-sensitive elements can be avoided.

It will be appreciated by those skilled in the art that the foregoing provides a control system which provides a running light function for a vehicle headlight system otherwise incapable of performing such a function, fully integrated with a system whereby the headlights, taillights and dashboard lights of the vehicle may be turned on whenever the windshield wiper system is engaged. The system further provides the flexibility to allow dusk-to-dawn control over the headlights. Each of the functions may operate independently, without interfering or disengaging the normal operation of either the windshield wipers or the light switch system. The following is a representative set of values for the components depicted in the figure.

| U1 | LM555CN |
|---|---|
| U2 | LM2903 |
| Q1, Q2, Q7 | 2N6667 |
| Q3–Q6 | 2N2222A |
| Q8 | 2907A |
| D1–D5 | 1N4148 |
| C1 | 1 mf |
| C2, C3 | .01 mf |
| C4 | 10 mf |
| R1 | 270 ohms |
| R2, R10 | 470 |
| R3 | 560K |
| R4 | 270K |
| R5, R7, R11, R17 | 10K |
| R6, R8, R18 | 4.7K |
| R12 | 10K variable |
| R13, R15, R16 | 100K |
| R14 | 1 meg |
| R19 | 220K |

We claim:

1. An apparatus for controlling the headlights of a vehicle, said vehicle having a power supply, a main power switch, and a windshield wiper control switch, comprising pulse generator means coupled to said power supply and to said headlights for providing a pulsed voltage to the headlights to energize said headlights at a low running light power level; and switching means coupled to said pulse generator, said main power switch and said windshield wiper control switch to deactivate said pulse generator means and engage said headlights at full power concurrently with activation of said windshield wiper control switch.

2. The apparatus of claim 1, wherein said pulse generator means includes a reset terminal, said switching means being coupled to said reset terminal.

3. The apparatus of claim 2 further including means operatively coupled to said main power switch for disabling said pulse generator when said main power switch is off.

4. The apparatus of claim 3, wherein said pulse generator means includes a timing capacitor, said means for disabling the pulse generator comprising shorting means across said capacitor.

5. The apparatus of claim 4, wherein said shorting means comprise a transistor junction enabled when said main power switch is off.

6. The apparatus of claim 1, wherein said switching means comprise a first switching transistor coupled to said wiper switch, said first switching transistor controlling first, second and third load control transistors in series between said power supply and said headlights, vehicle taillights and vehicle dashboard lights, respectively.

7. The apparatus of claim 6 further comprising means for generating an activating signal for said first, second and third power transistors when said vehicle is in darkness.

8. The apparatus of claim 7, wherein said means for generating an activating signal comprises at least one light sensor.

9. An apparatus for controlling the headlights of a vehicle, said vehicle having a power supply, a main power switch, and a windshield wiper control switch, comprising:

- a pulse generator coupled to the power supply and said main power switch and having a timing circuit, a reset input and an output terminal providing a pulse output control to a load control transistor switch providing power to said headlights whereby a low-level illumination drive to the headlights is provided when said pulse generator is active;

- a semiconductor switch activated by said windshield wiper control switch and coupled to said reset input of said pulse generator to place said output terminal and said transistor switch in a continuous on state during activation of the windshield wiper switch;

- said pulse generator being coupled to said main power switch through a switch which disables said timing circuit, preventing said output terminal from achieving an on state, when said main power switch is off.

10. The apparatus of claim 9 wherein said semiconductor switch is further coupled to additional vehicle lights to provide illumination power to said additional lights during activation of the windshield wiper switch.

11. The apparatus of claim 9 further comprising a light sensor circuit coupled to said reset input to place said output terminal and said transistor switch in a continuous on state when said vehicle is in darkness.

* * * * *